United States Patent
Kim et al.

(10) Patent No.: US 10,916,820 B2
(45) Date of Patent: Feb. 9, 2021

(54) BATTERY SYSTEM WITH IMPROVED LIFETIME PROPERTY AND METHOD FOR OPERATING BATTERY SYSTEM

(71) Applicant: LG CHEM, LTD., Seoul (KR)

(72) Inventors: Dae Soo Kim, Daejeon (KR); Han Young Lee, Daejeon (KR); Dong Kyu Kim, Daejeon (KR); Seok Koo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 196 days.

(21) Appl. No.: 16/060,552

(22) PCT Filed: Mar. 31, 2017

(86) PCT No.: PCT/KR2017/003560
§ 371 (c)(1),
(2) Date: Jun. 8, 2018

(87) PCT Pub. No.: WO2017/217646
PCT Pub. Date: Dec. 21, 2017

(65) Prior Publication Data
US 2019/0006635 A1   Jan. 3, 2019

(30) Foreign Application Priority Data
Jun. 14, 2016 (KR) .................. 10-2016-0073666

(51) Int. Cl.
*H01M 2/02* (2006.01)
*H01M 2/36* (2006.01)
(Continued)

(52) U.S. Cl.
CPC ......... *H01M 50/10* (2021.01); *H01M 10/056* (2013.01); *H01M 10/0525* (2013.01);
(Continued)

(58) Field of Classification Search
CPC ............ H01M 2/02; H01M 2/10; H01M 2/36; H01M 10/0525; H01M 10/056
See application file for complete search history.

(56) References Cited

U.S. PATENT DOCUMENTS 8,752,573 B2   6/2014   Nishimura et al.
8,771,866 B2   7/2014   Yoon
(Continued)

FOREIGN PATENT DOCUMENTS

JP   2011-100634 A   5/2011
JP   2011-108368 A   6/2011
(Continued)

OTHER PUBLICATIONS

Cui et al., "Recovery Strategy and Mechanism of Aged Lithium Ion Batteries after Shallow Depth of Discharge at Elevated Temperature", ACS Applied Materials & Interfaces, 2016, 8 Pgs.
(Continued)

*Primary Examiner* — Kenneth J Douyette
(74) *Attorney, Agent, or Firm* — Birch, Stewart, Kolasch & Birch, LLP.

(57) ABSTRACT

The present invention relates to a battery system capable of mitigating the performance deterioration of a secondary battery cell and extending a period of use by additionally injecting a second electrolyte at a point in time when the capacity of the secondary battery cell has decreased, and a method for operating a battery system which can achieve the same.

10 Claims, 7 Drawing Sheets

(51) Int. Cl.
  *H01M 10/0525* (2010.01)
  *H01M 50/10* (2021.01)
  *H01M 10/056* (2010.01)
  *H01M 10/42* (2006.01)
  *H01M 50/60* (2021.01)
  *H01M 50/116* (2021.01)
  *H01M 50/124* (2021.01)
  *H01M 50/636* (2021.01)

(52) U.S. Cl.
  CPC ....... *H01M 10/42* (2013.01); *H01M 10/4242* (2013.01); *H01M 50/116* (2021.01); *H01M 50/124* (2021.01); *H01M 50/60* (2021.01); *H01M 50/636* (2021.01)

(56) References Cited

U.S. PATENT DOCUMENTS

| | | | |
|---|---|---|---|
| 2001/0028238 A1 | 10/2001 | Nakamura et al. | |
| 2006/0134527 A1* | 6/2006 | Amine | H01M 4/13 429/326 |
| 2010/0028772 A1* | 2/2010 | Yang | H01M 2/345 429/185 |
| 2011/0108134 A1 | 5/2011 | Nishimura et al. | |
| 2011/0171501 A1 | 7/2011 | Okumura et al. | |
| 2011/0210954 A1* | 9/2011 | Murphy | H01M 10/0525 345/211 |
| 2011/0300437 A1 | 12/2011 | Yi | |
| 2013/0093398 A1* | 4/2013 | Takabayashi | H01M 2/021 320/128 |
| 2013/0232772 A1* | 9/2013 | Tikhonov | H01M 4/139 29/623.5 |
| 2017/0040589 A1 | 2/2017 | Abe et al. | |

FOREIGN PATENT DOCUMENTS

| | | |
|---|---|---|
| KR | 2001-0082115 A | 8/2001 |
| KR | 10-2005-0041093 A | 5/2005 |
| KR | 10-2011-0109824 A | 10/2011 |
| KR | 10-2012-0076878 A | 7/2012 |
| KR | 10-2013-0095123 A | 8/2013 |
| KR | 10-2013-0134948 A | 12/2013 |
| KR | 10-2015-0029532 A | 3/2015 |
| KR | 10-2015-0088488 A | 8/2015 |
| WO | WO 2015/163279 A1 | 10/2015 |

OTHER PUBLICATIONS

International Search Report for PCT/KR2017/003560 dated Aug. 9, 2017.
Extended European Search Report, dated Dec. 14, 2018, for European Application No. 17813471.4.
"A High Density Lithium Secondary Battery", Techno Systems Co., Ltd., Mar. 14, 1998, p. 173 (with English translation).

* cited by examiner

BATTERY SYSTEM WITH IMPROVED LIFETIME PROPERTY AND METHOD FOR OPERATING BATTERY SYSTEM

BACKGROUND OF THE INVENTION

(a) Field of the Invention

This application claims priority to and the benefit of Korean Patent Application No. 10-2016-0073666 filed in the Korean Intellectual Property Office on Jun. 14, 2016, the entire contents of which are incorporated herein by reference.

The present invention relates a battery system having improved cycle-life properties and a method for operating the battery system.

(b) Description of the Related Art

As various portable information and communication devices are widely used according to brilliant development of IT (Information Technology), a 'ubiquitous society' capable of providing high quality information services regardless of times and places are progressing in $21^{st}$ century.

This progress of the ubiquitous society is importantly spurred and supported by a lithium secondary battery cell. Specifically, a chargeable and dischargeable lithium secondary battery cell is not only widely used as an energy source for a wireless mobile device or a wearable electronic device on a human body but also as an energy source for an electric vehicle, a hybrid electric vehicle, and the like, which is suggested to solve a problem such as an air pollution and the like of a conventionally fossil fuel using vehicle such as a gasoline vehicle, a diesel vehicle, and the like.

The lithium secondary battery cell has a structure of housing an electrode assembly including a lithium-based positive electrode, a negative electrode reversibly intercalating and deintercalating lithium ions, and a separator and an electrolyte solution providing the electrode assembly with an ion transport pathway in a battery case.

The lithium secondary battery cell has an inevitably shortened cycle-life according to repetitive charge and discharge cycles and thus may rarely realize desired power characteristics during the long-term use.

Specifically, the lithium secondary battery cell may have a reduced cycle-life, since a crystal structure of the positive and negative electrodes is collapsed and gradually decreased due to a side-reaction between an electrode surface and the electrolyte solution, and the electrolyte solution is also depleted during this process during the repetitive charges and discharges.

Particularly, as the electrolyte solution is depleted, mobility of the lithium ions is deteriorated, thus internal resistance is increased, and accordingly, performance of the lithium secondary battery cell is sharply deteriorated.

In this way, the performance deterioration of the lithium secondary battery cell during the long term use may have a direct influence on a device using the lithium secondary battery, and for example, as capacity of a plurality of lithium secondary battery cells is decreased due to the repetitive charges and discharges, a vehicle requiring high power may drive in a shorter distance and experience less power. These problems may be solved by replacing the lithium secondary battery cells or discard the vehicle, which may be economically unfavorable.

Accordingly, an electric power-driving system of secondary battery cells capable of minimizing the performance deterioration despite a long term use of the lithium secondary battery cells is really needed.

SUMMARY OF THE INVENTION

The present invention aims to solve the above-described problems of the conventional art and technical problems required from the past.

Specifically, the purpose of the present invention is to provide a battery system capable of mitigating the performance deterioration of a secondary battery cell and extending a period of use by additionally injecting a second electrolyte at a point in time when the capacity of the secondary battery cell has decreased and method for operating a battery system which can achieve the same.

First, a battery system to achieve the purpose of the present invention is a battery system including one or two or more secondary battery cells, wherein the battery system includes a first state where an electric power is generated by a secondary battery cell having a structure where a first electrolyte solution and an electrode assembly are contained in a battery case and the battery case is sealed;

a second state where an electric power is generated by a secondary battery cell having a 20% to 60% reduced maximum capacity compared with the first state; and a third state where an electric power is generated by a secondary battery cell wherein a second electrolyte solution having a different composition from a first electrolyte solution is additionally injected into the battery case in the second state where the maximum capacity is reduced;

wherein the secondary battery cell in the third state to which the second electrolyte solution is added has a 10% to 60% lower internal resistance than the secondary battery cell in the second state.

In general, as a charge and discharge cycle of a secondary battery cell is repeated, internal resistance is increased due to depletion of an electrolyte solution, but in the battery system according to the present invention, the resistance increase due to the depletion of the electrolyte solution may be suppressed by supplementing a second electrolyte solution in a state that maximum capacity of the secondary battery cell is reduced down to a predetermined value. The reason is that the supplement of the second electrolyte solution improves ion mobility.

In addition, the maximum capacity decrease in the second state may be substantially caused by deterioration of ion exchange reversibility according to deformation of a crystal structure of a material forming an electrode, wherein a side-reaction with an electrolyte solution may work as one reason, and accordingly, the present invention is to supplement the second electrolyte solution based on the maximum capacity decrease in the third state.

The inventors of the present invention found out that the second electrolyte solution may alleviate the crystal structure collapse of a material forming an electrode by additionally injecting the second electrolyte solution in the third state, and thus the capacity decrease phenomenon is remarkably alleviated despite the repetitive charges and discharges of the secondary battery cell. This is another reason of converting the secondary battery cell from the second state into the third state thereof.

However, when the secondary battery cell of the second state shows maximum capacity that is reduced by greater than 60% compared with that of the first state, the capacity decrease phenomenon may not be substantially alleviated, even though the secondary battery cell of the second state is converted into that of the third state by injecting the second electrolyte solution thereinto, while when the second electrolyte solution is injected into the secondary battery cell having capacity that is reduced by less than 20%, a resistance decrease effect may not be expected.

As for specific examples related thereto, the secondary battery cell of the second state may generate electric power as a secondary battery cell having 25% to 45% reduced maximum capacity compared with that of the secondary battery cell of the first state, and the secondary battery cell of the third state may generate electric power by injecting the second electrolyte solution into the secondary battery cell of the second state when its maximum capacity is 25% to 45% reduced.

The battery system according to the present invention may have a structure that at least two secondary battery cells are electrically coupled in series and/or in parallel and provide an external device with electric power.

Hereinafter, a secondary battery cell constituting the battery system is described in detail.

In a specific embodiment, the battery case may be a laminate sheet including a metal layer and resin layer; and the secondary battery cells in the first state and the second state may have a structure where external circumference sides of the laminate sheet are heat-fused in a state where the electrode assembly and the first electrolyte solution are contained in the laminate sheet.

Meanwhile, the battery case may be a laminate sheet including a metal layer and resin layer, and the secondary battery cell in the third state may have a structure where external circumference sides of the laminate sheet are heat-fused in a state where the electrode assembly, the first electrolyte solution, and the second electrolyte solution are contained in the laminate sheet.

In other words, as the battery system is converted into the first state into the second state and then, into the third state, the secondary battery cell may additionally include the second electrolyte solution, and thus a usable period of the secondary battery cell may be extended due to the aforementioned capacity deterioration ease and resistance decrease effect.

The laminate sheet may consist of a pouch-type container for containing an electrode assembly and a cover to shut the container and when the cover overlaps with the container and is close thereto, external circumference sides thereof may heat-fused and thus sealed.

A secondary battery cell including this battery case is referred to be a pouch-type battery cell or a sheet-shaped battery cell in a narrow sense.

Since the laminate sheet forming the battery case consists of a soft packing material in this secondary battery cell, a battery shape may be easily transformed, slim, and light, but since the battery case cannot be open after once sealed, an internal structure of the secondary battery cell is difficult to change or repair.

Accordingly, the secondary battery cell of the present invention may be from the first and second states including the first electrolyte solution alone may be converted into the third state additionally including the second electrolyte solution through a particular structure which will be described later.

For one example, the battery case may include a perforated opening at a portion near to heat-fused external circumference sides, and the opening may be sealed and an insulation tape may be added in a state of injecting the second electrolyte solution into the battery case through the opening.

In this structure, the opening may be formed in the second state and may have a diameter of 0.001 mm to 0.01 mm and one or two or more openings may be formed on the battery case for inside gas discharge along with injection of the electrolyte solution.

When the opening has a smaller size than a minimum value of the range, an electrolyte solution is not only difficult to inject due to the too small size, but an electrode may also be destroyed due to an internal pressure formed during the injection, but when the opening has a larger size than a maximum value of the range, the air inflows during the injection, and thus the electrode may be oxidized, and the opening is difficult to firmly seal after the injection.

The insulation tape is not particularly limited as long as a material has electrical insulation, moisture barrier properties, and low reactivity with an electrolyte solution, and may be for example polypropylene that is the same material as the laminate sheet.

In addition, the insulation tape may have a structure where an adhesive component is added on one surface thereof. However, the adhesive component may be added on one side of the insulation tape except for at least a place corresponding to the opening in order to prevent the adhesive component from contacting the electrolyte solution through the opening.

For another example, the battery case may include a perforated opening at a portion near to heat-fused external circumference sides and circumference sides of the opening may be sealed in a form of heat-fusion in a state of injecting the second electrolyte solution into the battery case through the opening.

In this structure, the opening may be formed in the second state and may have a diameter of 0.001 mm to 0.01 mm, and one or two or more openings may be formed on the battery case for discharge of inside gases along with injection of the electrolyte solution.

Meanwhile, in the present invention the first electrolyte solution may include a lithium salt, a non-aqueous based solvent, and an electrode passivation-film forming agent.

The lithium salt is a material that is dissolved in the non-aqueous electrolyte and may be for example LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic lithium carbonate, lithium 4 phenyl borate, imide, etc.

The non-aqueous based organic solvent may be for example an aprotic organic solvent such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, an ether, methyl propionate, ethyl propionate, etc.

The electrode passivation-film forming agent forms a solid electrolyte interface (SEI) passivation film on the surface of the negative electrode and may be an agent to improve ionic conductivity in an electrolyte solution and vinylene carbonate, propane sultone, a silane-based material, a propionate-based material, etc.

The second electrolyte solution may not include an electrode passivation-film forming agent unlike the first electrolyte solution and may have a different composition from the first electrolyte solution, and in details, may include a lithium salt and a non-aqueous based solvent alone.

In the first state and the second state, the electrode passivation-film forming agent of the first electrolyte solution already forms a solid electrolyte interface on an electrode, and thus in the third state, an electrode passivation-film forming agent is not separately added, and for another reason, when the electrode passivation-film forming agent is added in the third state, a solid electrolyte interface is additionally formed to cause increase of resistance and decrease of electrode reversibility.

The lithium salt and the non-aqueous based solvent of the second electrolyte solution may be the above described examples and for one example, may be the same lithium salt and non-aqueous based solvent as the first electrolyte solution, or for another example, may be a different lithium salt and non-aqueous based solvent from the first electrolyte solution.

In addition, the second electrolyte solution in the third state may be included in an amount capable of replacing the depleted first electrolyte solution as well as causing no volume increase of the secondary battery cell, but when the amount of the second electrolyte solution is too small, a desired resistance decrease effect of the present invention is difficult to expect, and thus the amount of the second electrolyte solution may be 3% to 50% based on the total weight of the first electrolyte solution in the first state.

The present invention provides a method for operating a battery system including one or two or more secondary battery cells.

The method specifically includes, (a) generating an electric power using a secondary battery cell having a structure where a first electrolyte solution and an electrode assembly are contained in a battery case and the battery case is sealed;

(b) detecting a maximum capacity of the secondary battery cell when a charge and discharge cycle of the secondary battery cell is 50 to 2000 cycles;

(c) additionally injecting a second electrolyte solution into the secondary battery cell when the maximum capacity measured in the process (b) is 10% to 50% lower than a maximum capacity in the process (a); and (d) generating an electric power with the secondary battery cell to which the second electrolyte solution is added in the process (c).

In other words, the method of the present invention may suppress a capacity decrease and a resistance increase of the secondary battery cell and simultaneously, extend use time of the secondary battery cell by replacing the depleted first electrolyte solution according to the repetitive charges and discharged in the steps (a) to (b) with the second electrolyte solution in the step (c).

In a specific embodiment, the battery case may have a structure where a laminate sheet including a metal layer and resin layer is heat-fused, the step (c) may further include (i) perforating at a part of the heat-fused laminate sheet to provide an opening, wherein the second electrolyte solution may be injected into the secondary battery cell through the opening. In some cases, at least one additional opening may be further perforated in order to release gas present inside the secondary battery cell in the step (i).

In addition, the step (c) may further include a step (ii) of closing and sealing the opening after completely injecting the second electrolyte solution.

Herein, when the second electrolyte solution is injected, the opening may be perforated to have a diameter of 0.001 mm to 0.01 mm and simultaneously closed and sealed by an electrolyte solution injector in order to prevent exposure of the electrode of the electrode assembly to outside air.

When the opening has a smaller size than a minimum value of the range, it may not only be too small to inject the electrolyte solution, but the electrode may also be destroyed due to an internal pressure formed during the injection, but when the opening has a larger size than a maximum value of the range, the air may inflow during the injection, and thus the electrode may be oxidized, and the opening is difficult to firmly close and seal after the injection.

The step (ii) may be a process of heat-fusing an edge of the opening or adding an insulation tape to the edge of the opening and thus sealing and closing the opening and the edge of the opening.

The insulation tape is not particularly limited as long as a material has electrical insulation, moisture barrier properties, and low reactivity with an electrolyte solution, and may be for example polypropylene that is the same material as the laminate sheet.

In addition, the insulation tape may have a structure that an adhesive component such as an adhesive, etc. is added on one side. However, the adhesive component may be added on the rest of the insulation tape except for at least a place corresponding to the opening in order to prevent mutual contact of the adhesive component with the electrolyte solution through the opening.

The second electrolyte solution in the step (c) may be 3% to 50% of the total amount of the first electrolyte solution initially present in the secondary battery cell in the step (a).

When the second electrolyte solution is less than 3% of the total weight of the first electrolyte solution, a resistance decrease effect of the present invention may not be expected, but when the second electrolyte solution is greater than 50% of the total weight of the first electrolyte solution, a volume of a secondary battery cell may be undesirably increased.

The first electrolyte solution may include a lithium salt, a non-aqueous based solvent, and an electrode passivation-film forming agent and the second electrolyte solution may include a lithium salt and a non-aqueous based solvent.

The lithium salt is a material that is dissolved in the non-aqueous electrolyte and may be for example LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic lithium carbonate, lithium 4 phenyl borate, imide, etc.

The non-aqueous based organic solvent may be for example an aprotic organic solvent such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, an ether, methyl propionate, ethyl propionate, etc.

The electrode passivation-film forming agent forms a solid electrolyte interface (SEI) passivation film on the surface of the negative electrode and may be an agent to improve ionic conductivity in an electrolyte solution and vinylene carbonate, propane sultone, a silane-based material, a propionate-based material, etc.

It is noted that the second electrolyte solution does not include an electrode passivation-film forming agent because the electrode passivation-film forming agent of the first electrolyte solution already forms a solid electrolyte interface on an electrode.

If the second electrolyte solution includes an electrode passivation-film forming agent, a solid electrolyte interface is additionally formed on an electrode of a secondary battery to increase resistance or decrease electrode reversibility for ion intercalation and deintercalation.

The second electrolyte solution may be composed of the same lithium salt and non-aqueous based solvent as the first electrolyte solution or a different lithium salt and non-aqueous based solvent from the first electrolyte solution.

In the present invention, the secondary battery cell is not particularly limited, but specific examples thereof may be a lithium secondary battery such as a lithium ion (Li-ion) secondary battery, a lithium polymer (Li-polymer) secondary battery, or a lithium ion polymer (Li-ion polymer) secondary battery having high energy density, discharge voltage, power stability, and the like.

The lithium secondary battery is composed of a positive electrode, a negative electrode, a separator, and a lithium salt-containing non-aqueous electrolyte.

The positive electrode may be manufactured, for example, by applying a mixture of a positive active material, a conductive material, and a binder on a positive current collector and/or an extended current collecting part followed by drying and a filler may be further added to the mixture as needed.

The positive current collector and/or the extended current collecting part is generally formed to have a thickness of 3 to 500 μm. The positive current collector and extended current collecting part are not particularly limited as long as they have electrical conductivity without causing a chemical change in the battery and may be for example, stainless steel, aluminum, nickel, titanium, sintered carbon, or aluminum or stainless steel on which carbon, nickel, titanium, silver, or the like is surface-treated. The positive current collector and extended current collecting part may have fine concavo-convex formed on a surface thereof to enhance adherence of the positive active material and may be used in various forms such as films, sheets, foils, nets, porous bodies, foams, non-woven fabrics, etc.

Examples of the positive active material may include layered compounds including lithium cobalt oxide (LiCoO$_2$), lithium nickel oxide (LiNiO$_2$), and the like, or compounds substituted with one or more transition metals; lithium manganese oxides represented by Chemical Formula Li$_{1+x}$Mn$_{2-x}$O$_4$ wherein x is 0 to 0.33, LiMnO$_3$, LiMn$_2$O$_3$, LiMnO$_2$, etc.; lithium copper oxides (Li$_2$CuO$_2$); vanadium oxides such as LiV$_3$O$_8$, LiFe$_3$O$_4$, V$_2$O$_5$, Cu$_2$V$_2$O$_7$, etc.; Ni-site type lithium nickel oxides represented by Chemical Formula LiNi$_{1-x}$M$_x$O$_2$ wherein M is Co, Mn, Al, Cu, Fe, Mg, B or Ga, and x is 0.01 to 0.3; lithium manganese complex oxides represented by LiMn$_{2-x}$M$_x$O$_2$ wherein M is Co, Ni, Fe, Cr, Zn or Ta, and x is 0.01 to 0.1 or Li$_2$Mn$_3$MO$_8$ wherein M is Fe, Co, Ni, Cu or Zn; LiMn$_2$O$_4$ in which a part of Li in the Chemical Formula is substituted with an alkaline earth metal ion; disulfide compounds; Fe$_2$(MoO$_4$)$_3$, etc., but the positive active material is not limited thereto.

The conductive material is generally added in an amount of 1 to 30 wt % based on the total weight of the mixture including the positive active material. The conductive material is not particularly limited as long as it has electrical conductivity without causing a chemical change in the battery and examples of the conductive material may include graphite such as natural graphite, and artificial graphite, or the like; carbon black such as carbon black, acetylene black, ketjen black, channel black, furnace black, lamp black, and summer black, or the like; a conductive fiber such as a carbon fiber, a metal fiber, or the like; a metal powder such as carbon fluoride, aluminum, nickel powder, or the like; conductive whisker such as zinc oxide, potassium titanate, or the like; conductive metal oxide such as titanium oxide, or the like; conductive material such as a polyphenylene derivative, or the like, may be used.

The binder is a component which assists in bonding of the active material and the conductive material, etc., and bonding to the current collector, and is generally added in an amount of 1 to 30 wt % based on the total weight of the mixture containing the positive active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, a styrene butylene rubber, a fluorine rubber, various copolymers, etc.

The filler is optionally used as a component for suppressing expansion of the positive electrode, and is not particularly limited as long as it is a fibrous material without causing a chemical change in the battery and examples of the filler may include olefin-based polymers such as polyethylene, polypropylene, etc.; fibrous materials such as glass fibers and carbon fibers, etc.

The negative electrode may be manufactured by applying a negative active material on a negative current collector and/or extended current collecting part, followed by drying and the above-described components may be optionally included as needed.

The negative current collector and/or extended current collecting part is generally formed to have a thickness of 3 to 500 μm. The negative current collector and/or the extended current collecting part are not particularly limited as long as they have electrical conductivity without causing a chemical change in the battery and may include for example copper, stainless steel, aluminum, nickel, titanium, sintered carbon, copper surface or a stainless steel on which carbon, nickel, titanium, silver, or the like is a surface-treated, or an aluminum-cadmium alloy. In addition, similar to the positive current collector, the negative current collector and/or the extended current collecting part may have fine concavo-convex formed on a surface thereof to enhance bonding force of the negative active material, and may be used in various forms such as films, sheets, foils, nets, porous bodies, foams, non-woven fabrics, etc.

Examples of the negative active material may include carbon such as non-graphitized carbon, graphite-based carbon, etc.; a metal composite oxide such as Li$_x$Fe$_2$O$_3$ (0≤x≤1), Li$_x$WO$_2$ (0≤x≤1), Sn$_x$Me$_{1-x}$Me'$_y$O$_z$ (Me: Mn, Fe, Pb, Ge; Me': Al, B, P, Si, Group 1, Group 2 and Group 3 elements in the Periodic Table, a halogen; 0<x≤1; 1≤y≤3; and 1≤z≤8), and the like; a lithium metal; a lithium alloy; a silicon-based alloy; a tin-based alloy; a metal oxide such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$ and Bi$_2$O$_5$, etc.; a conductive polymer such as polyacetylene, etc.; a Li—Co—Ni-based material, etc.

The separator is interposed between the cathode and the anode, and as the separator, an insulating thin film having high ion permeability and mechanical strength is used. The separator generally has a pore diameter of 0.01 to 10 μm and generally has a thickness of 5 to 300 μm. As the separator, for example, olefin-based polymers such as polypropylene having chemical resistance and hydrophobicity; a sheet or a non-woven fabric made of glass fiber, polyethylene, or the like, is used. When a solid electrolyte such as a polymer is used as the electrolyte, the solid electrolyte may also serve as the separator.

The first electrolyte solution and the second electrolyte solution may be an organic solid electrolyte or an inorganic solid electrolyte besides the non-aqueous based organic solvent.

Specifically, the organic solid electrolyte may include, for example, a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer including an ionic dissociation group, etc.

The inorganic solid electrolyte may include, for example, Li nitrides, Li halides, Li sulfates such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_3PO_4$—$Li_2S$—$SiS_2$, etc.

DETAILED DESCRIPTION OF THE EMBODIMENTS

Hereinafter, the present invention will be described with reference to the drawings according to embodiments of the present invention, which is provided for a better understanding of the present invention, and thus, the scope of the present invention is not limited thereto.

Figure 1:
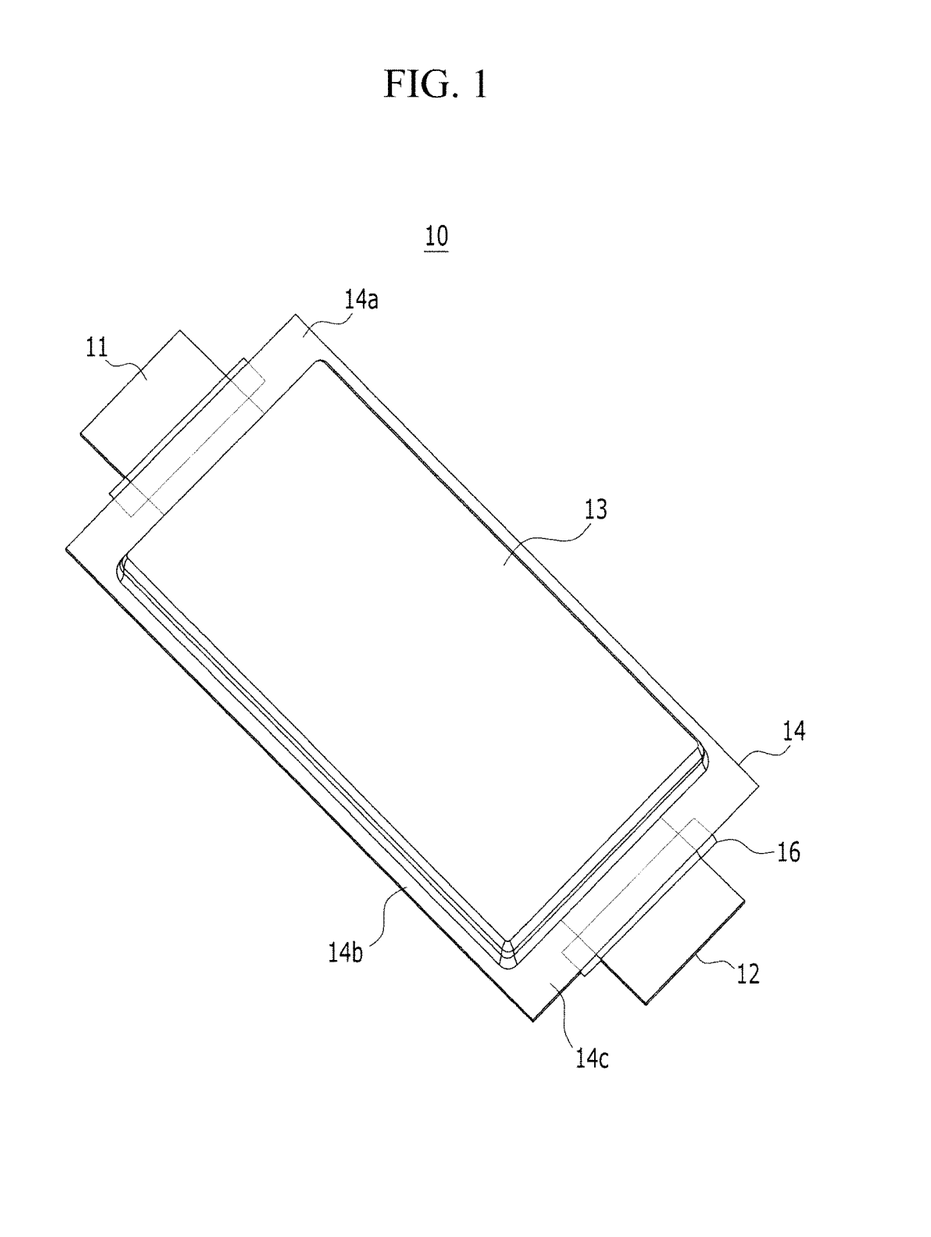
FIG. 1 is a schematic view of a battery system according to an embodiment of the present invention.
Figure 2:
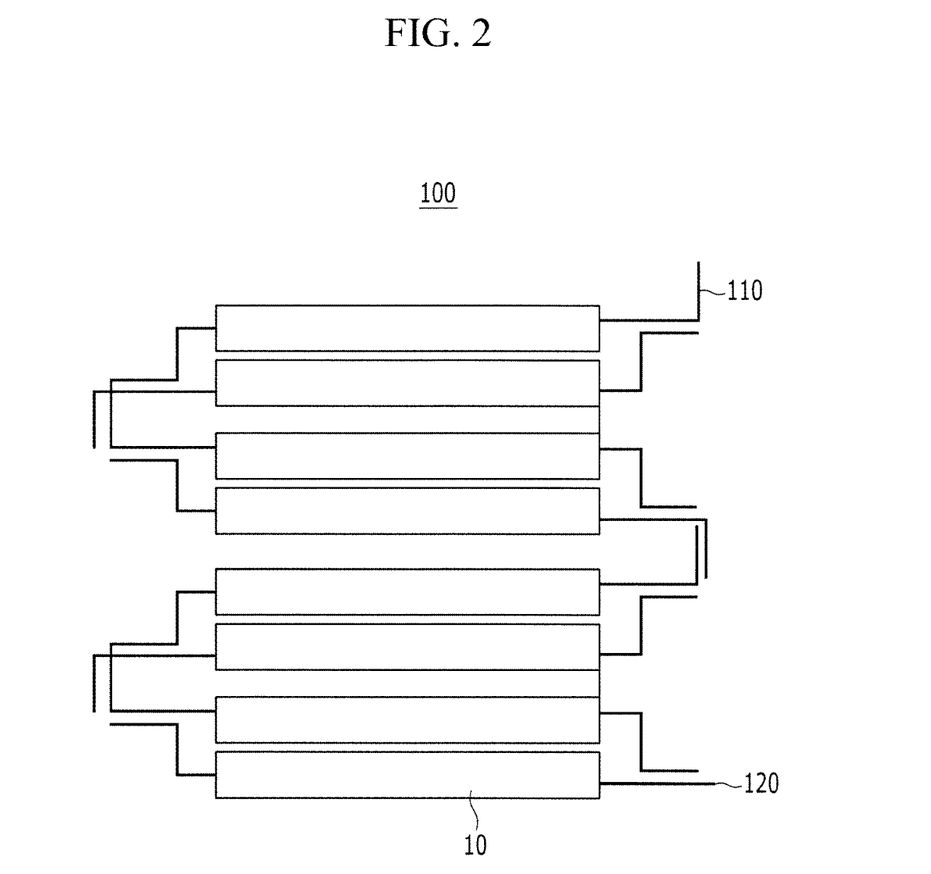
FIG. 2 is a schematic view of the secondary battery cell in a first state and a second state.
Figure 3:
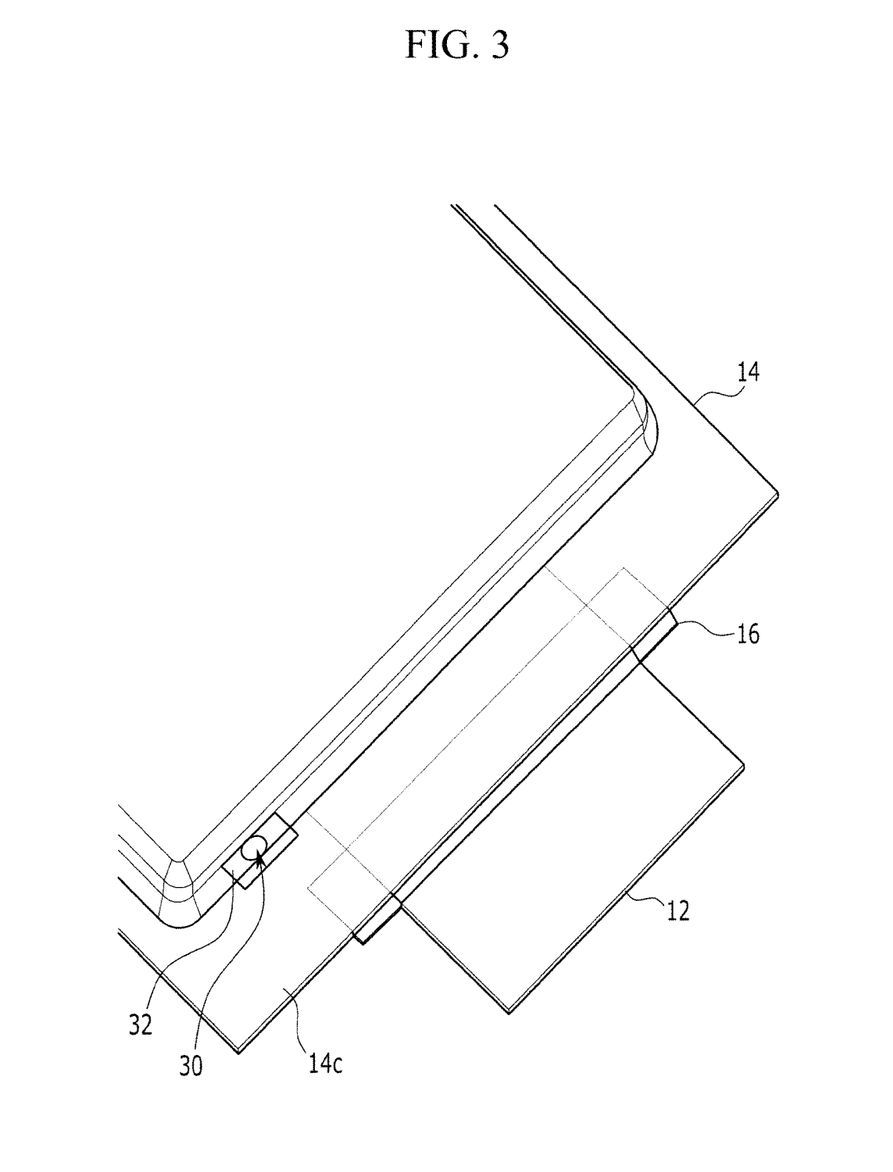
FIG. 3 is a schematic view of the secondary battery cell in a third state.

FIG. 1 is a schematic view of a battery system according to an example embodiment of the present invention, FIG. 2 is a schematic view of secondary battery cells in a first state and a second state, and FIG. 3 is a schematic view of a secondary battery cell in a third state.

Referring to these drawings, a battery system 100 has a structure wherein each of four units includes two secondary battery cells 10 connected in parallel, and a positive terminal 110 and a module negative terminal 120 are drawn out of one side of the battery system 100.

In the present invention, a maximum capacity of the secondary battery cells 10 in the battery system 100 is rarely decreased, which is defined as a first state.

The battery system 100 in the first state initially includes the secondary battery cells 10 shown in FIG. 2 and generates an electric power by the secondary battery cells 10.

Referring to FIG. 2, the secondary battery cells 10 in the first state includes two electrode terminals 11 and 12 facing each other and respectively protruding from an upper end and lower end of a battery cell body 13.

A battery case 14 is composed of two upper and lower units and a container formed thereinside for housing a first electrolyte solution (not shown) and an electrode assembly (not shown), and the secondary battery cell 10 is fabricated by bonding both external circumference sides 14b contacting each other with upper end and lower end external circumferential surfaces 14a and 14c, while the first electrolyte solution and the electrode assembly are housed in the container.

The battery case 14 has a laminate structure of a resin layer/a metal thin layer/a resin layer, and thus both external circumference sides 14b contacting each other are bonded with the upper end and lower end external circumferential surfaces 14a and 14c by applying heat and a pressure to mutually fuse the resin layers, if necessary, by using an adhesive.

When these secondary battery cells 10 are several times repetitively discharged and charged, each secondary battery cells 10 may have about 20% to 60% reduced capacity relative to maximum capacity in the first state, and when the secondary battery cells 10 having decreased maximum capacity within the range generates electric power, it is defined as a second state of the battery system 100.

In other words, the battery system 100 in the present invention is substantially classified based on a performance change of each secondary battery cell 10. In addition, the battery system 100 of the second state and the secondary battery cells 10 is the same structure as shown in FIGS. 1 and 2.

However, when the battery system 100 of the second state is continuously operated, the first electrolyte solution is depleted, performance of the secondary battery cells 10 is sharply deteriorated, and thus the battery system 100 of the present invention is converted into a third state described later to suppress performance deterioration of the secondary battery cells 10.

Specifically, referring to FIG. 3, the secondary battery cells 10 in the third state has a structure that an opening 30 is perforated around an area adjacent to the heat-fused external circumference sides and closed and sealed by adding an insulation tape 32 while a second electrolyte solution is injected inside the battery case through the opening 30.

In other words, the secondary battery cell 10 according to the third state includes an electrode assembly, a first electrolyte solution, and a second electrolyte solution housed inside a laminate sheet.

Since the battery system 100 consisting of the secondary battery cells 10 having this structure and converted into the third state is charged with a second electrolyte solution to replace the depleted first electrolyte solution, a resistance increase and a sharp capacity decrease of each secondary battery cell due to depletion of the electrolyte solution is suppressed. Accordingly, a use period of the secondary battery cell through the third state of the battery system is extended.

Figure 4:
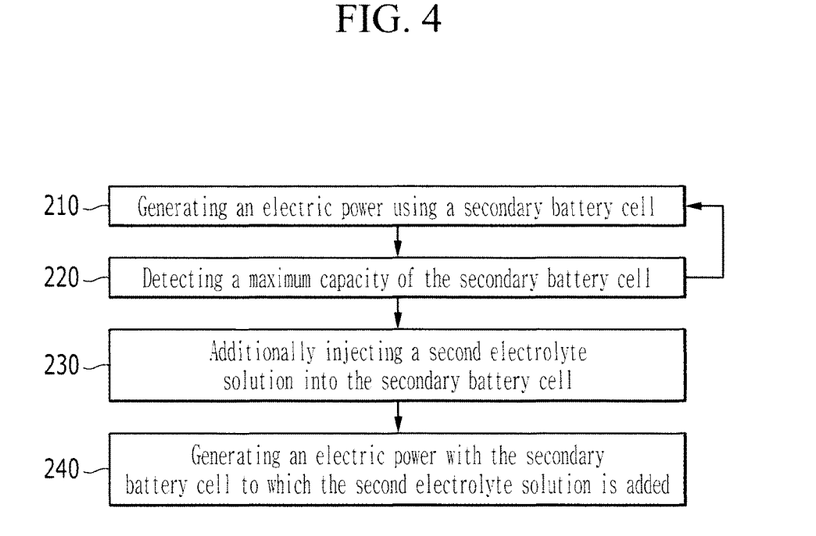
FIG. 4 is a flowchart showing a method according to according to an embodiment of the present invention.

FIG. 4 is a flowchart showing a method according to according to an embodiment of the present invention.

Referring to FIG. 4, in the step 210 of the method for operating a battery system according to the present invention, an electric power is generated using a secondary battery cell having a structure where a first electrolyte solution and an electrode assembly are contained in a battery case and the battery case is sealed.

The step 210 may further include charging the secondary battery cells when each of the secondary battery cells is discharged.

When this step 210 is repetitively performed within a 50 to 2000 charge and discharge cycle range, a step 220 proceeds, and herein, a maximum capacity of each of the secondary battery cells is detected.

When the detected maximum capacity of the secondary battery cells is less than 10% reduced relative to the maximum capacity in the step 210, the step 210 is repeated. Herein, the maximum capacity in the step 210 indicates capacity in a state that the secondary battery cells are fully charged for the first time in the step 210, and this capacity may be set based on capacity of one of the secondary battery cells or an average capacity of the secondary battery cells.

On the contrary, when the detected maximum capacity of the secondary battery cell is less than 10% to 50% reduced relative to the maximum capacity in the step 210, a step 230 proceeds to supplement the electrolyte solution.

Specifically, in the step 230, an opening is perforated in a part of the battery case, and through the opening, a second electrolyte solution is injected in 3% to 50% of the total weight of the first electrolyte solution present in the secondary battery cell in the step 210.

The opening may be perforated by an electrolyte solution injector equipped with a needle in the battery case to have a diameter of 0.001 mm to 0.01 mm and thus prevent exposure of an electrode of the electrode assembly to the outside air.

When the injection of the second electrolyte solution is completed, the opening is sealed so that the injected electrolyte solution may not be leaked.

A method of closing and sealing the opening may be performed by heat-fusing an edge of the opening or adding an insulation tape to the opening and the edge of the opening.

When the step 230 is complete, a step 240 proceeds to reoperate the battery system.

In this way, the method of the present invention may suppress a capacity decrease and a resistance increase of the secondary battery cell by additionally injecting a second electrolyte solution despite depletion of the first electrolyte solution according to the repetitive charges and discharges and thus extend a using period of the secondary battery cell.

Figure 5:
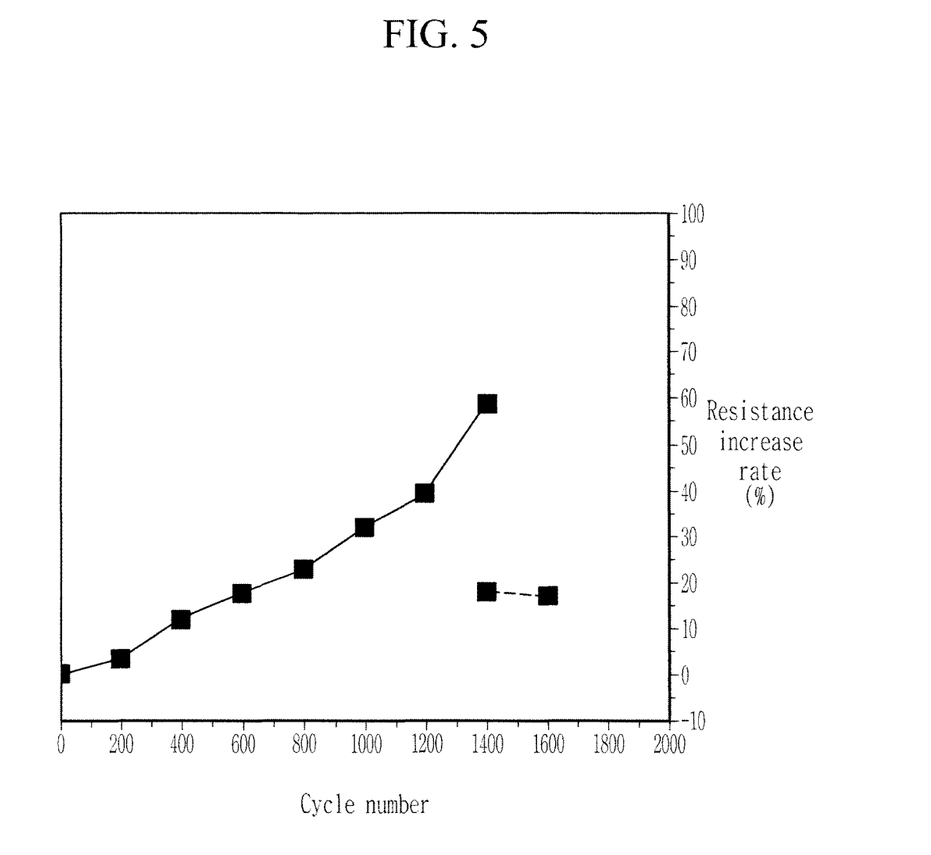
FIGS. 5 to 7 are schematic graphs showing changes of characteristics of the secondary battery cells due to injection of second electrolyte solutions.
Figure 6:
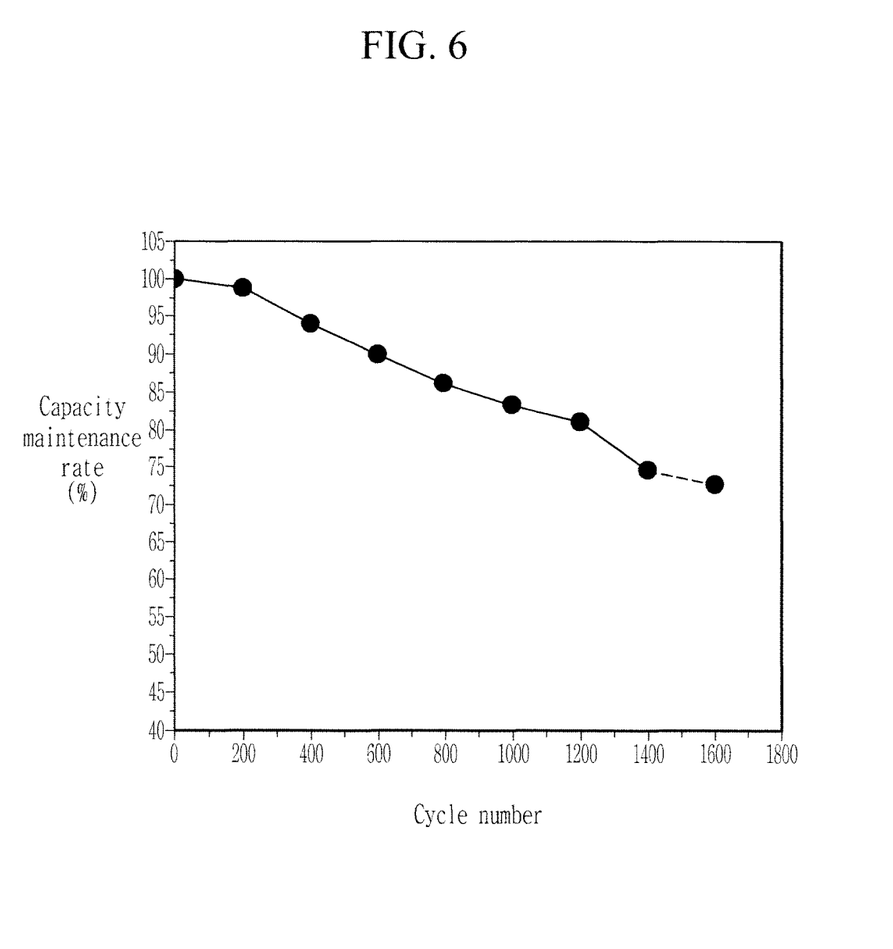
Figure 7:
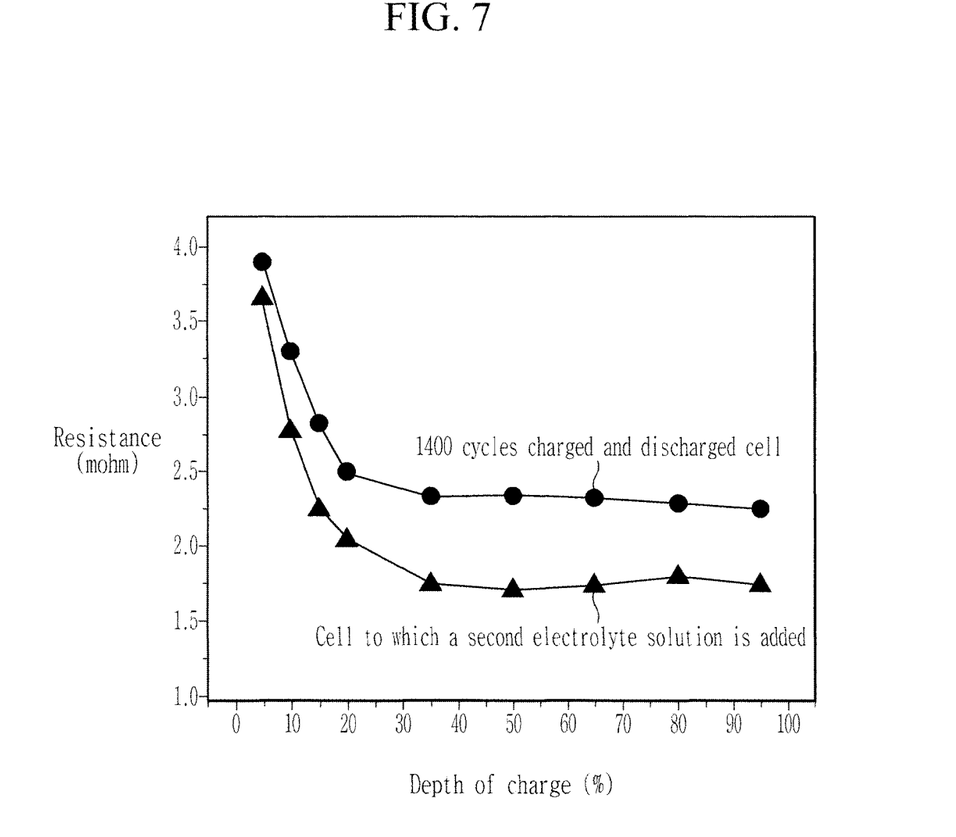

On the other hand, FIGS. 5 to 7 are graphs showing characteristic change results of the secondary battery cell due to injection of the second electrolyte solution.

Hereinafter, experiments and the results of FIGS. 5 to 7 are specifically described.

EXAMPLES 95 wt % of lithium nickel cobalt manganese composite oxide ($LiNi_{0.5}Mn_{0.3}Co_{0.2}O_2$) as a positive active material, 3 wt % of Super-P (a conductive agent), and 2 wt % of PVdF (a binder) were added to NMP to prepare positive electrode mixture slurry. The positive electrode mixture slurry was coated on one side of an aluminum foil and then, dried and compressed to fabricate a positive electrode.

A negative electrode was fabricated by adding 95.8 wt % of natural graphite coated with amorphous carbon as a negative active material, 1 wt % of Super-C (a conductive agent), and 2.2 wt % of SBR (a binder), to 1 wt % of a thickener to $H_2O$ as a solvent to prepare negative electrode mixture slurry and coating the negative electrode mixture slurry on one surface of a copper foil and then, drying and compressing it.

The positive and negative electrodes were combined with a first electrolyte solution prepared by mixing vinylene carbonate and propane sultone as an electrode passivation-film forming agent and $LiPF_6$ as a lithium salt in a solvent of EC:DMC:EMC=3:2:5 and a separator to form an electrode assembly.

Subsequently, the electrode assembly was housed in a battery case made of a laminate sheet, and the battery case was closed and sealed to fabricate a pouch-type large cell.

Experimental Example 1

Resistance of the pouch-type large cell according to Example was measured by every 200 cycle unit, while 1400 cycles charged and discharged. Then, a second electrolyte solution prepared by adding $LiPF_6$ as a lithium salt to a solvent of EC:DMC:EMC=3:2:5 was additionally injected into the pouch-type large cell, then, resistance of the pouch-type large cell was measured after additionally 200 cycles charging and discharging the pouch-type large cell, and the results are shown in FIG. 5.

Referring to FIG. 5, a resistance increase rate of the pouch-type large cell including the first electrolyte solution alone gradually increased during the 1400 cycles but sharply increased up to about 60% at about 1400 cycles. However, when the second electrolyte solution was added to the pouch-type large cell, the resistance increase rate of the pouch-type large cell was decreased down to 18%.

For reference, the resistance increase rate is obtained as a ratio of initial resistance of the pouch-type large cell and its resistance formed as the cycles are increased.

Experimental Example 2

Capacity of the pouch-type large cell according to Example was measured by every 200 cycle unit, while the pouch-type large cell was 1400 cycles charged and discharged. Herein, when the capacity was about 35% reduced, capacity of the pouch-type large cell was measured again by additionally injecting a second electrolyte solution including $LiPF_6$ as a lithium salt in a solvent of EC:DMC:EMC=3:2:5 into the pouch-type large cell and additionally 200 cycles charging and discharging the pouch-type large cell, and the results are shown in FIG. 6.

Referring to FIG. 6, as the pouch-type large cell were repetitively charged and discharged, the capacity gradually decreased, but after the second electrolyte solution was added thereto, the capacity decrease became remarkably slow.

Experimental Example 3

Resistance of the pouch-type large cell of Example was measured, while completely charged up to maximum capacity after 1400 cycles charging and discharging the pouch-type large cell and completely discharging it.

Subsequently, after completely discharging the pouch-type large cell, while a second electrolyte solution including $LiPF_6$ as a lithium salt in a solvent of EC:DMC:EMC=3:2:5 was injected into the pouch-type large cell, resistance of the pouch-type large cell was measured, while the pouch-type large cell was completely charged up to maximum capacity.

FIG. 7 is a comparison graph showing these two resistances. Referring to FIG. 7, the pouch-type large cell showed higher resistance in a state that the second electrolyte solution was injected thereinto than before the additional injection of the second electrolyte solution.

It will be understood by those skilled in the art that various modifications and change can be made in the scope of the present invention based on the above description.

As described above, the battery system according to the present invention may remarkably reduce resistance by additionally injecting a second electrolyte solution into a secondary battery cell in a state that maximum capacity of the secondary battery cell is reduced down to a predetermined value. In addition, the second electrolyte solution may replace the depleted first electrolyte solution and delays collapse of a crystal structure of a material forming an electrode and thus sharply ease a capacity deterioration phenomenon despite repetitive charges and discharges of the secondary battery cell.

The method according to the present invention may replace the depleted first electrolyte solution according to the repetitive charges and discharges in the steps (a) to (b) with the second electrolyte solution in the step (c) and thus suppress a capacity decrease and a resistance increase of the secondary battery cell and simultaneously, extend a using period of the secondary battery cell.

What is claimed is:

1. A battery system comprising one or two or more secondary battery cells
wherein the battery system includes
a first state where an electric power is generated by a secondary battery cell having a structure where a first electrolyte solution and an electrode assembly are contained in a battery case and the battery case is sealed;
a second state where an electric power is generated by a secondary battery cell having a 20% to 60% reduced maximum capacity compared with the first state; and
a third state where an electric power is generated by a secondary battery cell wherein a second electrolyte solution having a different composition from a first electrolyte solution is additionally added into the battery case in the second state where the maximum capacity is reduced,
wherein the secondary battery cell in the third state to which the second electrolyte solution is added has a 10% to 60% lower internal resistance than the secondary battery cell in the second state,
wherein the first electrolyte solution includes a lithium salt, non-aqueous based solvent and electrode passivation-film forming agent;
wherein the second electrolyte solution includes a lithium salt and a non-aqueous based solvent; and
wherein the second electrolyte solution does not include an electrode passivation-film forming agent,
wherein the battery case includes a perforated opening at a portion near to heat-fused external circumference sides, and the opening is sealed and an insulation tape is added in a state of injecting the second electrolyte solution into the battery case through the opening, and
wherein the opening is perforated in the second state and has a diameter of 0.001 mm to 0.01 mm.

2. The battery system of claim 1, wherein the battery case is a laminate sheet including a metal layer and resin layer; and
the secondary battery cells in the first state and the second state have a structure where external circumference sides of the laminate sheet are heat-fused in a state where the electrode assembly and the first electrolyte solution are contained in the laminate sheet.

3. The battery system of claim 1, wherein the battery case is a laminate sheet including a metal layer and resin layer; and
the secondary battery cell in the third state has a structure where external circumference sides of the laminate sheet are heat-fused in a state where the electrode assembly, the first electrolyte solution, and the second electrolyte solution are contained in the laminate sheet.

4. The battery system of claim 3, wherein the battery case includes a perforated opening at a portion near to heat-fused external circumference sides and circumference sides of the opening is sealed in a form of heat-fusion in a state of injecting the second electrolyte solution into the battery case through the opening.

5. The battery system of claim 1, wherein the second electrolyte solution in the third state is 3% to 50% of the total weight of the first electrolyte solution in the first state.

6. The battery system of claim 2, wherein the secondary battery cell in the second state shows 25% to 45% reduced maximum capacity compared with that of the secondary battery cell in the first state.

7. The battery system of claim 1, wherein at least two secondary battery cells are electrically coupled in series and/or in parallel and supply an external device with electric power.

8. The battery system of claim 1, wherein the first electrolyte solution comprises vinylene carbonate, propane sultone, and $LiPF_6$.

9. The battery system of claim 1, wherein the first electrolyte solution further comprises a solvent system of ethylene carbonate, dimethyl carbonate and ethyl methyl carbonate.

10. The battery system of claim 1, wherein the second electrolyte solution comprises $LiPF_6$ and a solvent system of ethylene carbonate, dimethyl carbonate and ethyl methyl carbonate.

* * * * *